United States Patent
Harrysson et al.

(10) Patent No.: US 8,213,757 B2
(45) Date of Patent: Jul. 3, 2012

(54) COMBINED DISPLAY AND ANTENNA ARRANGEMENT

(75) Inventors: Fredrik Harrysson, Göteborg (SE); Jonas Medbo, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 247 days.

(21) Appl. No.: 12/746,735

(22) PCT Filed: Dec. 6, 2007

(86) PCT No.: PCT/EP2007/063404
§ 371 (c)(1),
(2), (4) Date: Jun. 7, 2010

(87) PCT Pub. No.: WO2009/071127
PCT Pub. Date: Jun. 11, 2009

(65) Prior Publication Data
US 2010/0260460 A1   Oct. 14, 2010

(51) Int. Cl.
*G02B 6/04* (2006.01)
(52) U.S. Cl. ........................................... 385/120
(58) Field of Classification Search .................. 385/120
See application file for complete search history.

(56) References Cited

U.S. PATENT DOCUMENTS

| 7,847,753 B2 * | 12/2010 | Ishibashi et al. ............ 343/897 |
| 2002/0021501 A1 * | 2/2002 | Kawashima et al. ......... 359/742 |
| 2002/0122642 A1 * | 9/2002 | Kijima ........................... 385/120 |
| 2008/0260336 A1 * | 10/2008 | Hwang et al. ................ 385/120 |

FOREIGN PATENT DOCUMENTS

| EP | 1868261 A | 12/2007 |
| EP | 1868263 A | 12/2007 |
| JP | 2000/124730 A | 4/2000 |

* cited by examiner

*Primary Examiner* — Sung Pak
(74) *Attorney, Agent, or Firm* — Roger S. Burleigh (57) ABSTRACT

The present invention relates to a display and antenna arrangement comprising a primary display screen (30) and an antenna arrangement comprising a number of receiving and/or transmitting elements ($1A_{11}$, $1A_{12}$, $1A_{13}$) formed by an least in given areas electrically conductive layer and adapted to receive/transmit radio-, millimeter waves or microwaves. The electrically conductive layer is perforated and comprises a plurality of densely arranged holes ($4m, \ldots$) crossing the layer. Said holes ($4_{111}, \ldots$) contain a dielectric material. The perforated conductive layer is provided on the front of the primary display screen, said holes being adapted to guide light/optical information from the primary display screen through the electrically conductive layer, the outer surface of which facing away from the primary display screen. Said outer surface is adapted to act as a secondary, functional display screen.

19 Claims, 9 Drawing Sheets

COMBINED DISPLAY AND ANTENNA ARRANGEMENT

TECHNICAL FIELD

The present invention relates to a display and antenna arrangement which comprises a primary display screen and an antenna arrangement. The antenna arrangement comprises a number of receiving and/or transmitting elements which are formed in or by an electrically conductive layer and which are adapted to receive/transmit radio-, millimeter waves or micro-sub-microwaves or waves of any appropriate wavelength.

BACKGROUND

For wireless communication terminals with a display screen it is normally a requirement that the display should be capable of presenting the optical information with a high resolution and a high quality. It is however also important that the radio receiving and transmitting capability is good. It should also be possible to provide a good coverage of all possible directions for the relevant communication channels. In addition thereto a high data transmission capacity is needed, for single links as well as for the radio network or communication network as a whole. It has however been realized that it is difficult to meet all these objects to a satisfactory extent with known arrangements. It becomes even more difficult if it is considered that it also should be possible to exploit the potential receiving/transmitting capacity to the highest possible extent. For that purpose a communication terminal may be equipped with multiple antennas which couple independently to the different degrees of freedom of the communication channel. For a single wave the degrees of freedom are basically the direction and the polarization whereas in a real channel, the transmitted wave will be scattered by physical objects in the surrounding environment, the result of which is a so called multi-path channel. For a multichannel there will be many different pathways corresponding to different directions, at the receiver as well as at the transmitter. For a laptop it is known to use the frame surrounding the laptop display for an antenna means. On a laptop, however, the available space on the frame will be quite limited since normally it is desired to keep the display screen as large as possible at the same time as keeping the laptop itself as small as possible. This means that it becomes difficult to take full advantage of the data transmission capacity as well as to handle real multipath channels since antenna elements cannot be arranged freely and flexibly. It is not possible to arrange antenna elements, neither as far as e.g. the number of antenna elements is concerned, nor as far as their physical location is concerned, as would be needed for different applications. This particularly becomes an issue for advanced wireless communication systems, e.g. high speed wireless communication systems, requiring multiple antennas or antenna arrays. Particularly then it becomes difficult to provide sufficient coverage for all possible or desired directions.

In order to overcome the problems associated with the disadvantages resulting from the use of the frame for an antenna, it has been suggested to use the back side of a laptop display for antenna placement. If the back of the screen of a laptop is used, the antenna elements will however be screened by the display in the opposite direction. Since the radio paths having the best gain are typically concentrated within a limited angular range, and if the back of the laptop is directed away from this angular range, the strongest paths will be heavily attenuated, which is a serious problem. This problem will be even more pronounced for future high speed wireless communication system. Thus, all known solutions are associated with problems.

SUMMARY

It is an object of the present invention to provide a display and antenna arrangement as initially referred to which provides excellent optical representation capabilities at the same time as an excellent receiving and transmitting capability. It is also an object of the invention to provide a display and antenna arrangement wherein one functionality does not restrict or impair the other. Particularly the display screen should not impose restrictions as to where the antenna arrangement (or the antenna elements thereof) can be provided and the display screen should not restrict the receiving/transmitting capability of the antenna means and, at the same time, the antenna means should not restrict or affect the optical representation capability.

It is particularly an object of the invention to provide a display and antenna arrangement, e.g. for a wireless communication terminal, wherein both functionalities are excellent at the same as the arrangement as a whole can be made compact. It is also an object to provide an arrangement which is easy and cheap to fabricate. A particular object is to provide a display and antenna arrangement through which the antenna means are capable of efficiently covering all different directions of a multipath communication channel. Even more particularly it is an object to provide a display and antenna arrangement through which a particularly high spatial and polarimetric radio resolution can be offered, most particularly through which the resolution can be enhanced as compared to a conventional corresponding display screen.

Moreover it is an optional object to provide an arrangement through which a wireless communication device can be equipped with multiple antennas or antenna arrays coupling independently to different degrees of freedom of multipath transmission/reception radio channels. It should also be possible to receive/transmit on the strongest communication paths. It is also particularly an object to provide a display antenna arrangement through which it becomes possible to provide a wireless communication device, e.g. for advanced wireless communication systems, which in addition to excellent receiving/transmission capabilities, also offers excellent optical representation capabilities without demanding any additional space as compared to known wireless communication devices or wireless communication devices in general. Most particularly it is an object to provide a laptop or similar with a display and antenna arrangement through which one or more of the above mentioned objects can be achieved.

It is also an object to provide a method for receiving/transmitting radio-, millimeter, microwaves, sub-microwaves or waves with any wavelength, over a multipath communication channel at the same time as enabling an excellent representation of optical information wherein both functionalities are excellent and do not limit the performance of one another, and generally through which one or more of the above mentioned objects discussed with reference to the arrangement can be achieved.

Therefore a display and antenna arrangement as initially referred to is provided wherein the electrically conductive layer, or at least portions or given areas thereof, is/are perforated or comprises a plurality of densely arranged holes crossing the conductive layer or the given areas. Said holes or perforations are at least partly filled with or contain a dielectric material. The dielectrically conductive layer or areas which is/are perforated (or comprises a plurality of holes)

is/are provided on the front of the primary display screen. The holes or perforations are adapted to guide light or optical information from the primary display screen through said electrically conductive layer/said given areas which is/are arranged such that the outer surface thereof faces away from the primary display screen and whereby said outer surface is adapted to act as a secondary or functional display screen.

It is an advantage that substantially the whole area of the display screen, or at least any desired portions thereof, can be provided with a dual functionality (i.e. an antenna functionality and an optical representation functionality) without one of the functionalities being impaired or negatively affected by the other. It is also an advantage that a larger antenna means, for example for a wireless communication device, can be provided wherein the antenna means have an excellent functionality since antenna elements can be arranged flexibly wherever appropriate or needed and since it is not screened by or depend on the direction of the screen. It is also an advantage that a plurality of antenna elements or antenna arrays can be provided, wherein the antenna elements can be located in any desired manner and that a high degree of freedom is provided for implementation of most effective antenna arrays, for example for high speed wireless communication systems. It is also an advantage that an antenna arrangement is provided which enables a high data transmission capacity on single communication links as well as for an entire communication radio network and that a wireless communication terminal can be equipped with multiple antennas coupling independently to different degrees of freedom of a radio channel. It is also an advantage that through the inventive concept it becomes possible to, for an antenna arrangement of a wireless communication terminal, arrange antenna elements in any desired efficient way and provide the desired number of antenna elements where needed such that for example all possible or desired directions of a radio channel can be covered. It is a particular advantage that it becomes possible to utilize substantially the entire display surface of for example a laptop computer or similar both for e.g. radio communication and for presentation of optical information. It is also an advantage that an antenna arrangement for a wireless communication terminal can be provided with flexible antenna arrays with a high gain and with omni-directional properties for beam-forming and spatial multiplexing.

BRIEF DESCRIPTION OF THE DRAWINGS

The invention will in the following be further described, in a non-limiting manner, and with reference to the accompanying drawings, in which.

DETAILED DESCRIPTION

Figure 1:
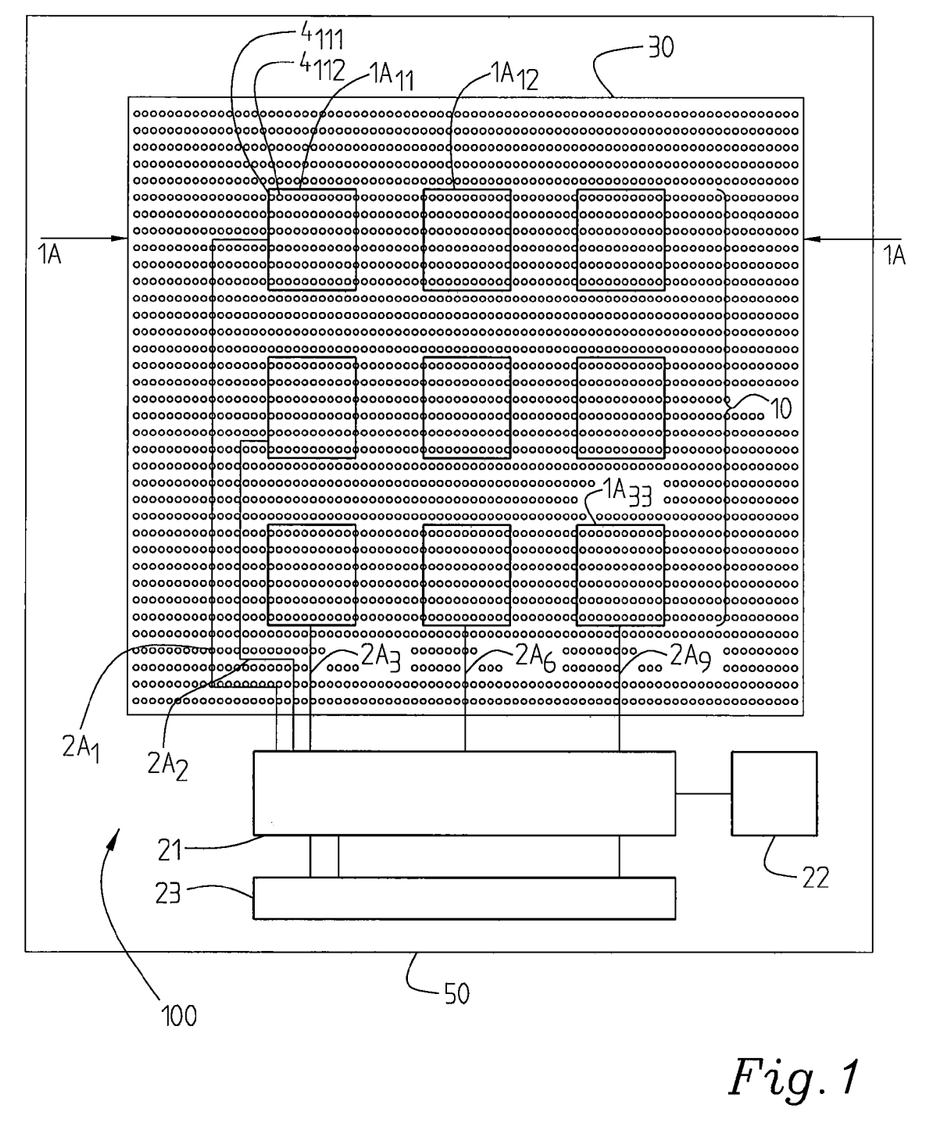
FIG. 1 is a schematical block diagram of a first embodiment of a display and antenna arrangement according to the invention.

FIG. 1 shows an implementation of a combined display and antenna arrangement 100 with receiving and transmitting elements acting as an antenna arrangement 10 comprising a number of antenna elements $1A_{11}, \ldots, 1A_{33}$. Although in FIG. 1 nine antenna elements are illustrated, this is of no significance, it could be any number of antenna elements (one, two, three etc.). The antenna elements here comprise square shaped antenna patches (they could be of any appropriate shape) in an electrically conductive layer which is adapted to be provided in front of, i.e. on top of, a display means 30 (display screen) of for example a laptop 50 or similar. Optionally only the antenna patches are electrically conductive. Alternatively the entire layer comprising the antenna patches is conductive. The antenna elements $1A_{11}, \ldots, 1A_{33}$ here comprise array antenna elements. The antenna elements are perforated with holes $4_{111}, 4_{112}, \ldots$ which are arranged with a high density, particularly they are so densely packed that they may not be resolved by the human eye. The holes $4_{111}, 4_{112}, \ldots$ of each antenna element are filled partly or completely with a dielectric material of an appropriate refractive index. The dielectric material has a refractive index substantially between 1.3 and 2 (or 1 to infinite) or adapted to be selected to provide optimal optical guiding properties. Typically it should be around 1.5 which corresponds to plastic or glass. Here each hole $4_{111}, \ldots$ is of a cylindrical shape adapted to guide light or optical information through the antenna arrangement. They may alternatively be of any other suitable shape. Preferably the full area of the layer is perforated so that the image will be of equal quality, irrespectively of whether there are antenna elements or not beneath. The antenna elements $1A_{11}, \ldots, 1A_{33}$ are via transmission lines $2A_1, \ldots, 2A_9$ connected to feeding and/or control means 21 for antenna feeding/controlling.

A grounding layer (not shown) is normally or inherently included in a display means 30. It may be used as a ground plane also for the antenna elements. Alternatively an antenna ground layer might be provided as a separate layer (on the back of the display screen) and to which the antenna elements are connected as will be further illustrated below. The transmission lines $2A_1, \ldots, 2A_9$ are connected to feeding and/or controlling means which particularly comprise or are included in switching and/or combining means 21, for example comprising switching and combining circuits controlled by controlling means 22, which here comprises a digital switching and combining control means. The antenna elements are particularly via ports, through the switching and/or combining means 21, connected to a so called RF radio chain (in this implementation). An RF/radio chain here means the electronics needed for e.g. down (up) conversion to intermediate frequencies, filtering, signal detection, separation between receive and transmit signals, analogue to digital conversion (for reception), digital to analogue conversion (for transmission) etc.

In the embodiment illustrated in FIG. 1 the antenna elements comprise patches which, as referred to above, can be of any shape. They can also be arranged in any appropriate manner, in one or more arrays etc. Through the provisioning of the perforations or holes it thus becomes possible to arrange the antenna arrangement in the most appropriate way since it does not affect the display functionality.

The antenna elements do not necessarily have to be patch antenna elements. They may also comprise for example dipole antennas or coplanar antennas. It is preferable to provide perforations in an entire (electrically conductive) layer acting as or comprising an antenna arrangement. The display means may comprise generally any type of display with a large number of light emitting elements, for example pixel elements, or a large number of controlling means such as transistors. In a particular implementation there is a one-to-one relationship between holes or perforations and pixel elements. There can also be more holes or perforations than pixel elements or, vice versa, more pixel elements than holes or perforations. Regardless of the type of antenna elements and display means, the functioning is similar to that described above. If the antenna means comprise coplanar antenna elements or dipole antennas, no ground plane is needed. For antenna patches a ground plane is required and then for example a ground plane normally inherently provided in the display means can serve the purpose of acting as a ground plane also for the antenna patches. It is also possible to use a separate ground plane. Multiple layers may be provided, containing also the ground plane, to be perforated.

The electrically conductive layer comprising the antenna arrangement may be disposed directly on the display means. Alternatively it may be provided on a support layer which is optically transparent but non-conducting (unless it also is provided with through holes or perforations).

Figure 2:
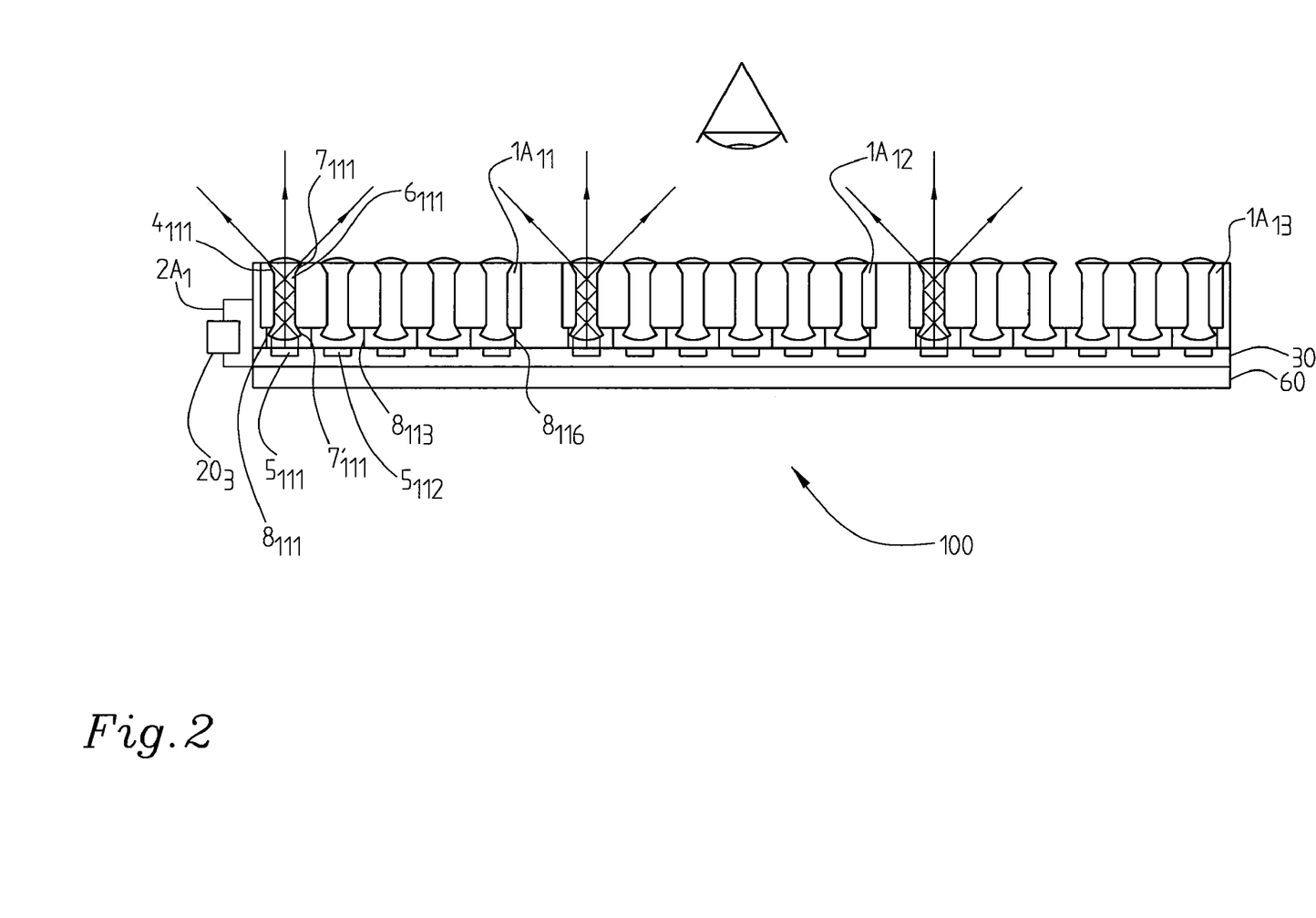
FIG. 2 is a cross-sectional view (in another scale) along the line 1A-1A of the arrangement shown in FIG. 1.

FIG. 2 is a very schematical enlarged cross-sectional view of the arrangement shown in FIG. 1 and in which the antenna layer is not integrated with the pixel elements of the optical screen. For reasons of clarity it should be clear that the proportions are not correct, also not with respect to FIG. 1. Thus, here the antenna layer is arranged on an optical screen without integration. The dielectric material in a hole is shaped as a convex lens to collect as much light as possible from the primary screen. The antenna elements $1A_{11}$, $1A_{12}$, $1A_{13}$ are here illustrated as having a considerable thickness; it should be clear that this is so merely for illustrative purposes, although actually, since waveguides are provided in or by means of the holes or perforations, it does not matter what the thickness of the antenna layer is, or the antenna elements. The optical waveguides may actually pass through multiple antenna layers. The antenna elements $1A_{11}$, $1A_{12}$, $1A_{13}$ are provided on a primary display 30 which here is provided on a grounding layer 60. The primary display comprises a large number of pixel elements $5_{111}$, $5_{112}$, ... and on top of the primary display means 30 an antenna layer is provided comprising the antenna elements $1A_1$, $1A_2$, $1A_3$. Preferably the perforations are optically isolated (screened) by screening means $8_{111}$, ... so that the light from the primary screen is not mixed between the perforations, i.e. the purpose of the screening means is to ensure that light from a pixel element is collected by/guided through only one optical waveguide. At the outer surface, which provides the optical image to the user, the dielectric material may also be ended in a convex/concave shape to spread the light in all or all desired directions.

A plurality of densely arranged holes or perforations $4_{111}$, ... are thus provided through the respective antenna elements (preferably the whole layer comprising the antenna elements) through which optical fibres $6_{111}$, ... have been introduced comprising a dielectric material as discussed above such that they will act as optical waveguides. At the outer end of each optical fibre or optical waveguide a lens device $7_{111}$, ... is provided adapted to spread the optical information or light when output from the respective hole, i.e. from the secondary screen. At the other, inner, end of each optical fibre or optical waveguide a convex lens device $7'_{111}$ is provided for collecting or collimating light input on the waveguide from the respective pixel element $5_{111}$, ... i.e. for collecting as much light as possible, or for focusing the light in the front direction of the primary screen. It should be clear that in alternative embodiments lens devices are only provided at the input or only at the output. The lens devices may comprise separate and distinct lens devices. In a most advantageous implementation the optical fibre has been treated in an appropriate manner to itself act as a convex/concave lens, for example by heat treatment or by compression or shaping to obtain the desired curvature/diameter. At the output the lenses are shaped or given properties so as to enable optimal spreading. Preferably the lenses are given properties depending how the light should be spread for the concerned application. Although shown as convex in FIG. 2, it should be clear that they may advantageously be concave for spreading purposes (depending on the properties of the light).

In the figure only transmission means $2A_1$ connected to the first antenna element $1A_{11}$ are illustrated for reasons of clarity. They are connected to switching and/or controlling means 20 which here are supposed to include one or more of the functionalities of means 21, 22, 23 shown in FIG. 1, all of which however not are illustrated for reasons of clarity and since they do not form part of the basic inventive concept.

Figure 3:
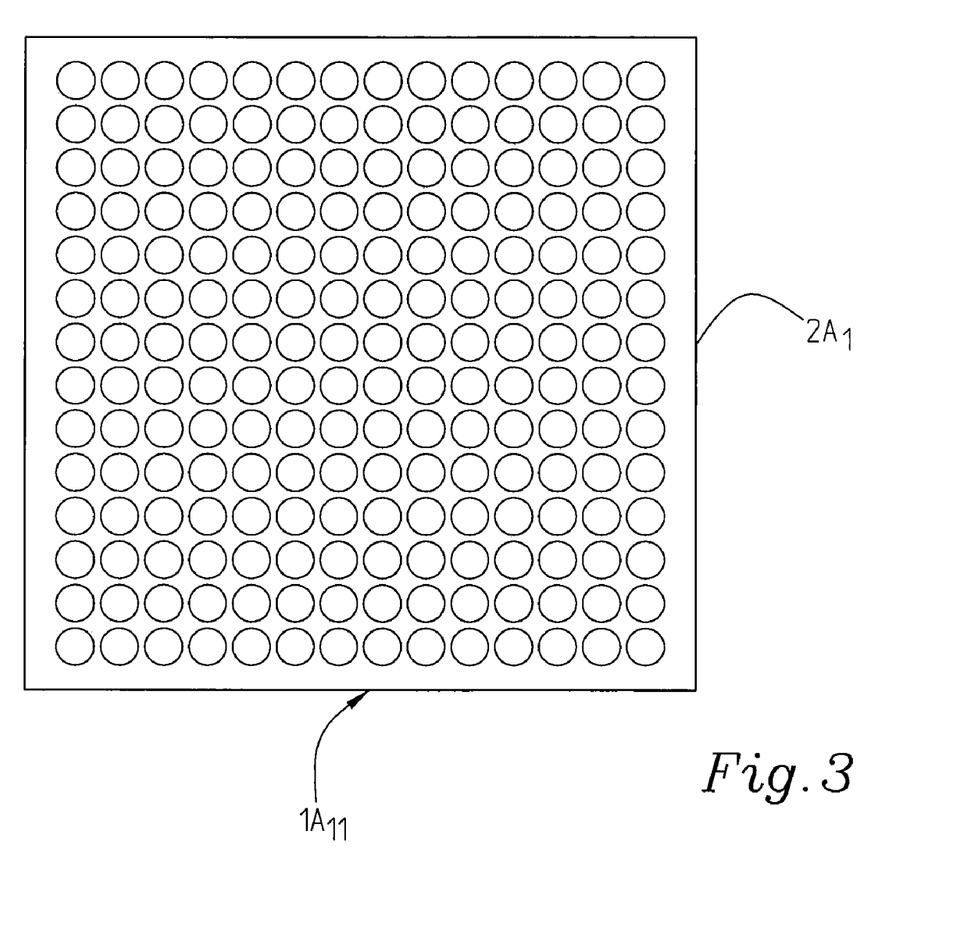
FIG. 3 is an enlarged top view of an antenna element as in FIG. 1.

FIG. 3 merely very schematically illustrates an antenna element $1A_{11}$ as in FIG. 1. It is connected to transmission line $2A_1$. It is merely is intended to illustrate that there is a large number of perforations and that they are arranged very densely (throughout at least the entire antenna element).

Figure 4A:
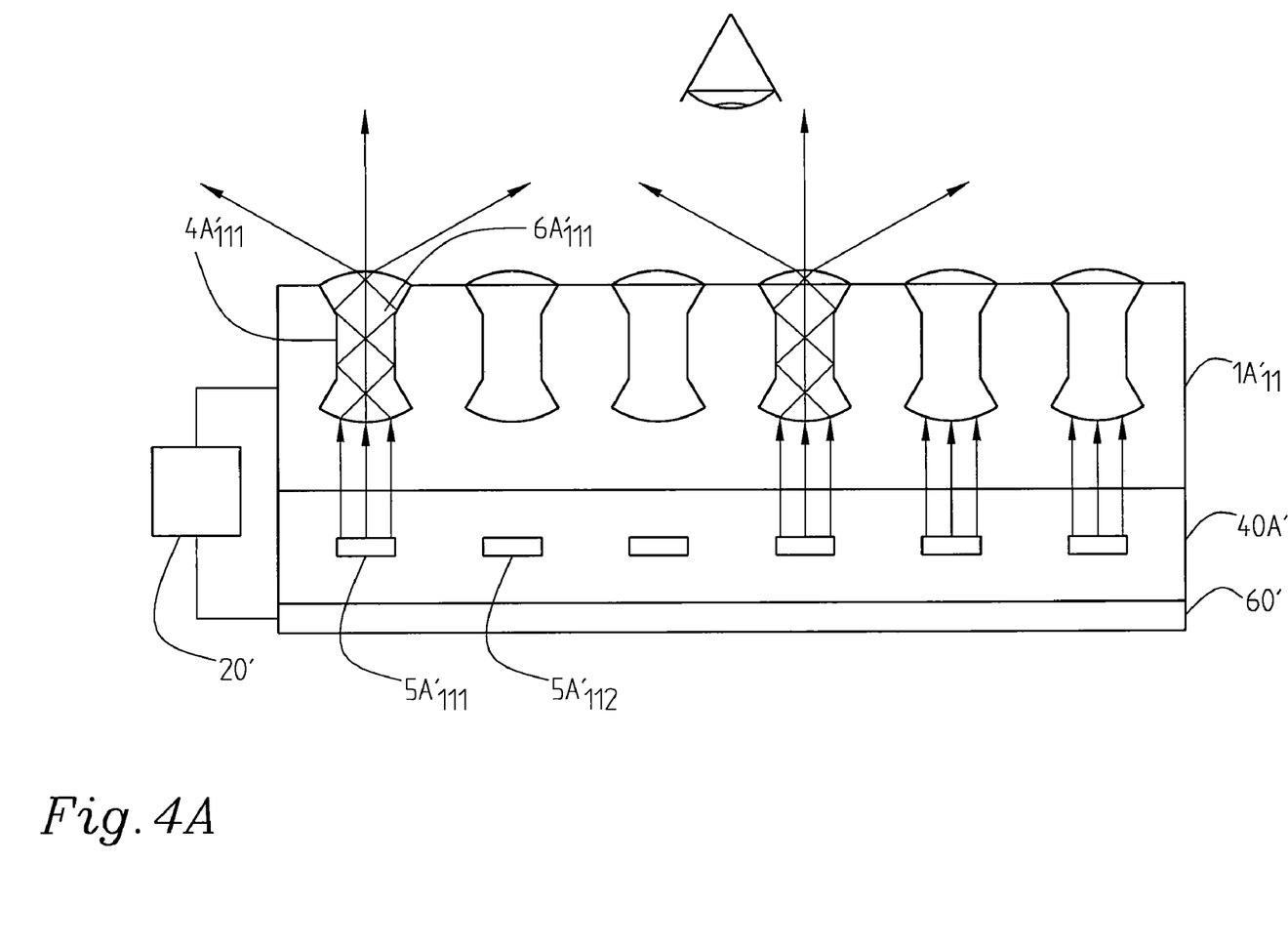
FIG. 4A is an enlarged cross-sectional view of an antenna element similar to the one in FIG. 3.

FIG. 4A is a cross-sectional view of an antenna element $1A'_{11}$. In cross-section only some of the perforations $4A'_{111}$, ... are shown. Light is guided from the pixel elements $5A'_{111}$, ... through the respective corresponding optical waveguide $6A'_{111}$. It is here supposed to be a one-to-one relationship between the number of pixel elements and perforations/optical waveguides. It is also supposed that the optical fibres have been shaped for example by heating, hence also including a lens functionality or acting as lenses at both ends, i.e. at the inner and outer ends respectively. Thus, light from the primary screen 40A' (from the corresponding pixel element $5A'_{111}$) is guided through the perforated antenna element $1A'_{11}$ by means of optical waveguide $6A'_{111}$. The purpose of the convex lenses, or collimating lens functionality at the inner ends, close to the pixel elements, is to collect as much light as possible from the primary screen (light or pixel element). The pixels are screened from each other by screening means (not shown in FIG. 4; reference is made to FIG. 2), so that a high image resolution is kept at the secondary screen. Light is collimated by the lenses which focus the light in the front direction of the primary screen. Preferably the distance from the primary screen/pixel elements to the optical waveguide input (lens) is as short as possible.

It is here supposed that the primary display screen is provided on a grounding plane 60' to which the patch antenna elements $1A'_{11}$ are connected via switching and/or controlling means 20'. The lens device at the respective outer waveguide end is adapted to spread the optical information as much as possible in all directions—or in a desired manner. Optionally a controlling functionality is given, i.e. the lenses can be given the desired properties. The lens or lens functionality (if any) is selected depending on the properties of the light and on the desired spreading properties.

Figure 4B:
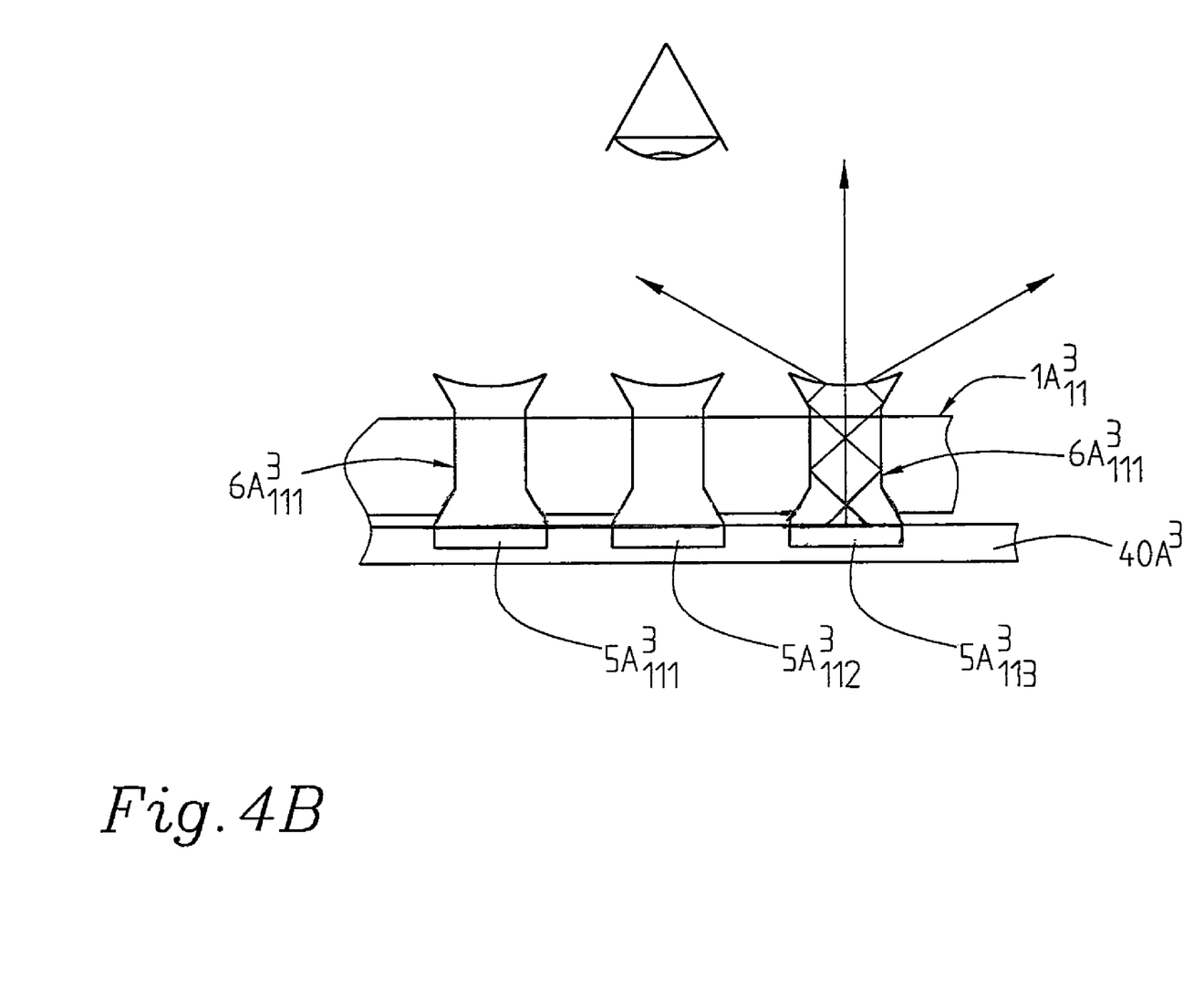
FIG. 4B is an enlarged cross-sectional view of an alternative antenna element.

FIG. 4B very schematically illustrates part of an antenna element $1A^3_{11}$ in cross-section. As in FIG. 4A light is guided from pixel elements $5A^3_{111}$, $5A^3_{112}$, $5A^3_{113}$ through optical waveguides $6A^3_{111}$, ... arranged in perforations. The pixel elements $5A^3{}_{111}, \ldots$ are arranged in a display layer or primary screen $40A^3$. The antenna layer containing the antenna elements in integrated with the pixel elements or the primary screen containing the pixel elements. The optical waveguides are here, at their outer ends, terminated as concave lenses for spreading the light. (The lenses may alternatively be convex or the terminations may be flat.)

Figure 5:
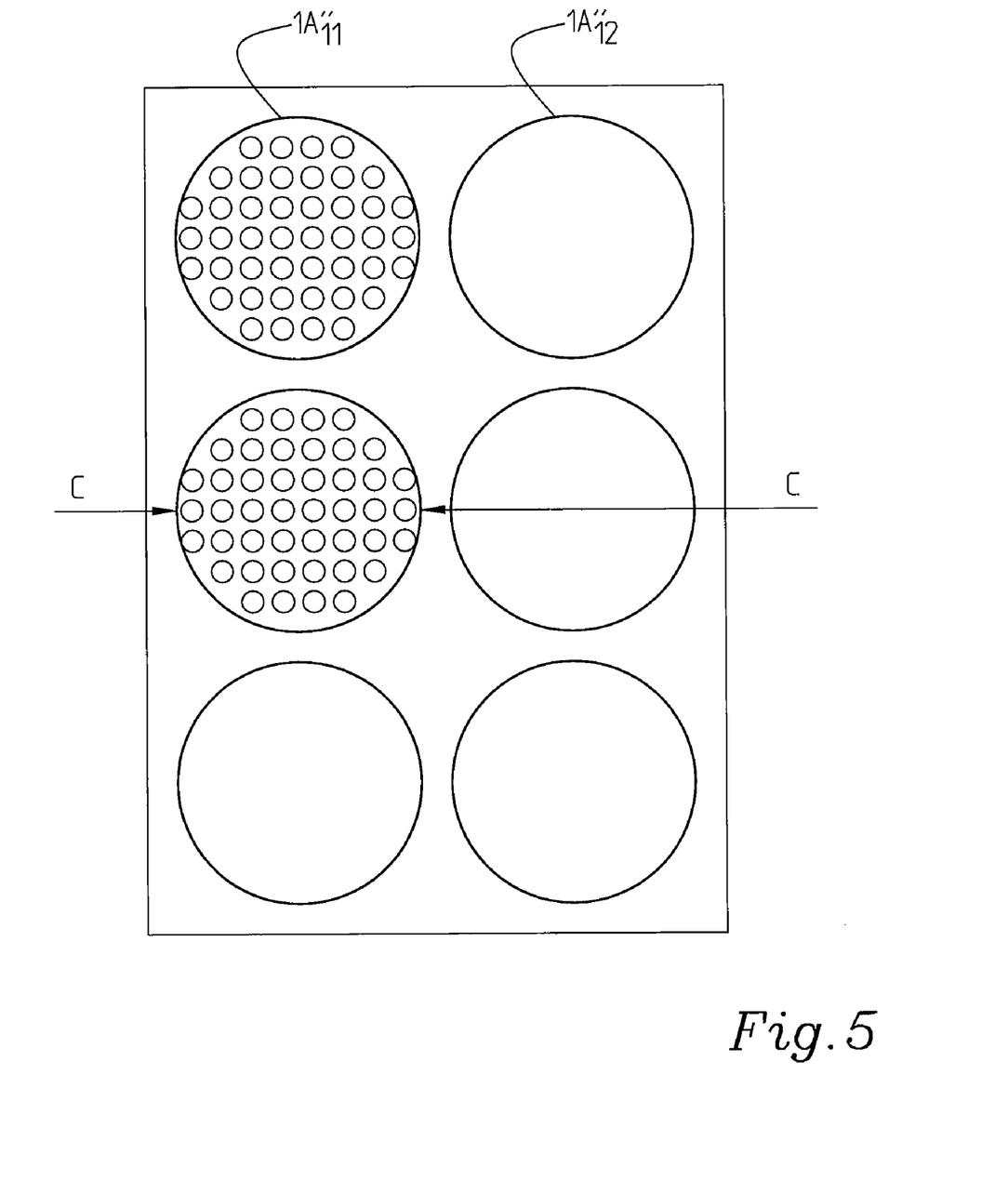
FIG. 5 is a very schematical block diagram of another embodiment of a display and antenna arrangement.

FIG. 5 is a very schematical top view of an antenna arrangement comprising a number of a circular antenna patches $1A''_{11}, \ldots, 1A''_{12}$. The sole intention with FIG. 5 is to illustrate explicitly that the antenna elements can be of any shape. Here only the antenna elements are perforated. Preferably, however, the whole layer should be perforated as discussed above.

Figure 6:
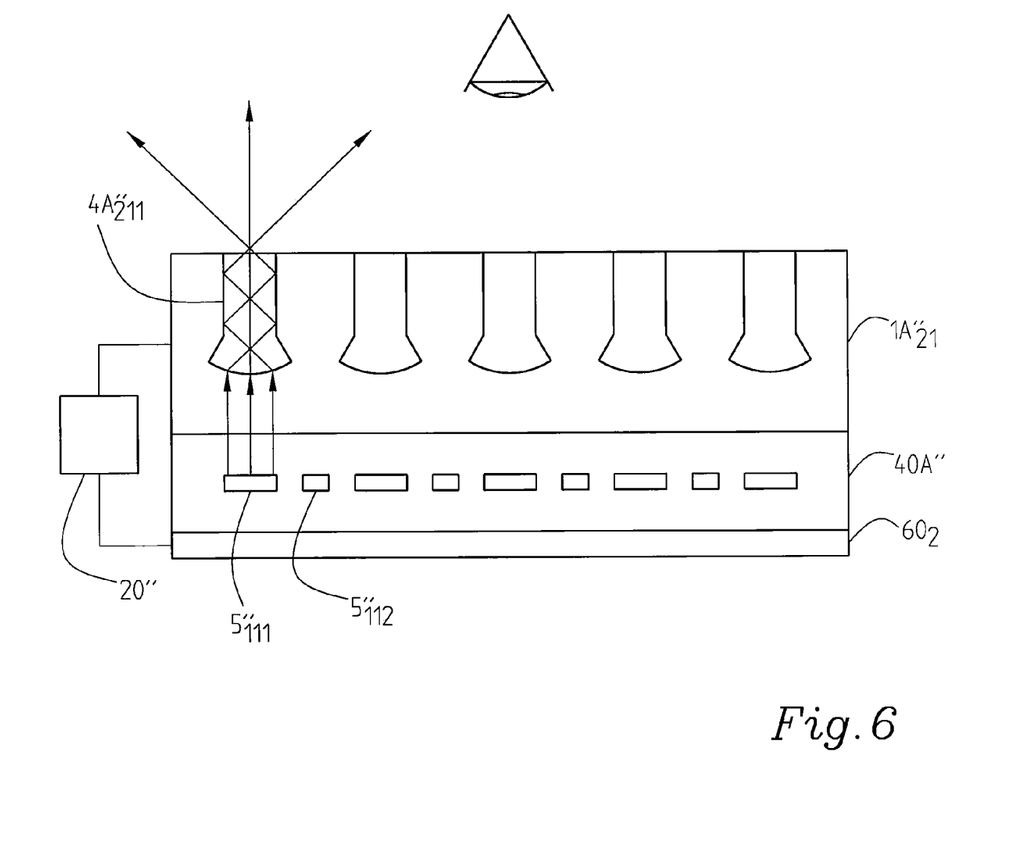
FIG. 6 is an enlarged cross-sectional view of an antenna element of a display and antenna arrangement as in FIG. 5.

FIG. 6 is an enlarged schematical cross-sectional view of an antenna element $1A''_{21}$ as in FIG. 5. As described with reference to the preceding embodiments the display means 40A'' is disposed on a grounding layer $60_2$ which is used as a ground plane also for the antenna, i.e. also for antenna element $1A''_{21}$. The antenna element comprises a plurality of perforations $4A''_{211}, \ldots$ (only a limited number of which are shown in this figure for reasons of clarity) for guiding light from pixel elements $5''_{111}, \ldots$. In this particular implementation there is not a one-to-one relationship between pixel elements and optical waveguides or perforations, instead there are more pixel elements than optical waveguides but, on the other hand, optionally the cross-sections of the holes may be somewhat larger and the lenses larger or constituted by a larger extension of the optical fibres. Alternatively they are more convex/concave, the radius or curvature is increased/decreased etc. Each antenna element is optionally connected to switching and/or controlling means 20''.

As can be seen from the figure there are no lens devices provided at the respective outer ends of the optical waveguides or perforations $4A''_{211}$. It should be clear that the particular arrangement shown in FIG. 6 has no relation to the antenna patches being circular but could be implemented independently of the shape, type or number of antenna elements. It should also be clear that lens devices could also have been provided at the outer ends or only at the outer ends etc., also this having no relation to the shape, type or to the number of antenna elements, nor to the relationship between the number of pixel elements and the number of perforations. In still another implementation the number of perforations could exceed the number of pixel elements (not shown). Optionally concave or convex lenses are used for spreading the light in an appropriate manner; cf. FIG. 2. Preferably screening means are provided e.g. between pixel elements $5''_{111}$ and $5''_{112}$ etc. or alternatively between pixel elements $5''_{112}$ and $5''_{112}$ etc. to control which waveguide should guide light from which pixel elements or elements (not shown in this figure). It should however be clear that most preferably all light from the primary screen is guided through optical waveguides/fibers so that the entire screen will guide light etc. by means of the same mechanism, even if there is no conductive material or antenna element.

Figure 7:
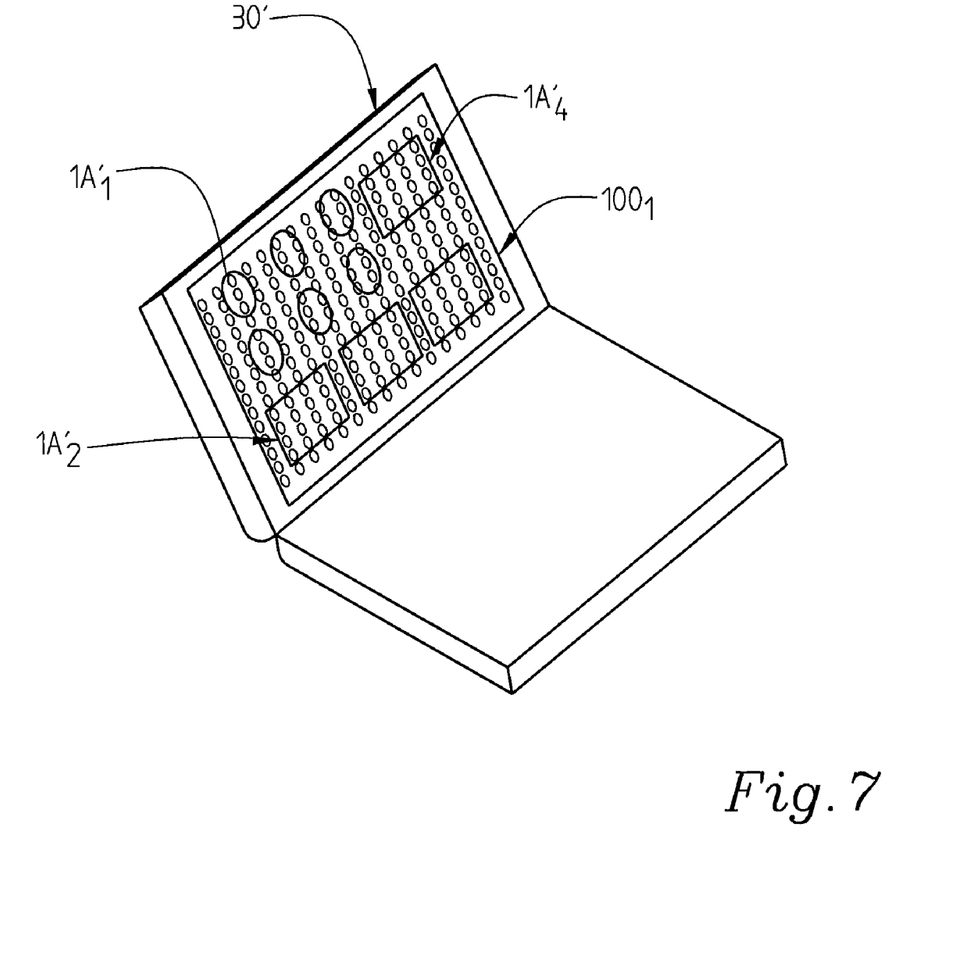
FIG. 7 is a very schematical illustration of a laptop with a display and antenna arrangement according to the present invention.

FIG. 7 shows an embodiment wherein a combined antenna and display arrangement $100_1$ is provided in association with the display screen 30' of a laptop. An electrically conductive layer comprising antenna elements $1A'_1, 1A'_2, 1A'_4$, here comprising antenna patches $1A'_1, 1A'_2, 1A'_4$ of different shapes, intends to illustrate that the inventive concept covers any type of antenna elements placed in front of the display screen 30'. It should be clear that implementations wherein the antenna elements comprise dipole antennas or coplanar antennas are also possible. It is also possible to simply provide an electrically conductive layer acting as an antenna (elements). The entire conductive layer or the layer (electrically conductive or not) containing the conductive antenna elements may be perforated, which is different from embodiments wherein only the antenna elements themselves are perforated.

Thus, on the surface of the display screen 30' different antenna structures can be arranged as for example also discussed in the copending patent application DISPLAY ARRANGEMENT filed on the same day and by the same applicant as the present application and the content of which herewith is incorporated herein by reference.

Optionally the sizes and/or the shapes of the antenna elements depend on the frequency and/or polarization properties of the communication channel on which radio-, millimeter wave and microwaves are received/transmitted. The antenna elements in advantageous implementations comprise patches as referred to above. It should be noted that through the use of the perforations, at least not for that reason, the thickness of the electrically conductive material is not restricted to any particular values, although normally, for other reasons, it is comparatively thin. It can optionally be provided on a support layer. If a support layer is used, it is attached on top of the display means, for example a display of a laptop. This support layer either has to be optically transparent or it has to be perforated in a similar manner as the electrically conductive layer comprising or forming the antenna elements. Each antenna element or group of antenna elements is preferably connected to a switching and/or combining device which optionally is integrated in the circuit board for example of the laptop, either in the display part or in the computer part. In some embodiments the antenna elements support dual polarizations. Then two transmission lines or conducting lines are connected to each antenna element.

In one embodiment the switching and/or combining means comprise or are connected to beam-forming means or MIMO (Multiple Input Multiple Output) spatial multiplexing means. This means for example that multiple antennas or antenna arrays, e.g. for future wireless communication systems, can be used for diversity, beam-forming gain or spatial multiplexing. Thus, it is a great advantage that through the present invention it becomes possible to select placement of and arrange antenna elements or arrays in any desired manner within a case of a terminal communication device, for example a multimedia device, and provide coverage of all possible or desired RF reception/transmission directions. It is also an advantage that it becomes possible to boost transmission capacity. Since substantially the entire surface of a display is available for the antenna arrangement, it becomes possible to provide more effective antenna arrays with high gain and omnidirectional properties, enabling beam-forming and spatial multiplexing in a terminal equipment, and the antennas can be adapted to the relevant applications and circumstances.

Normally the inventive concept is applicable for different types of displays or screens.

Two main categories of displays are the LCD and the LED displays. In LCD displays (liquid crystal display) the pixels are merely colored light regulators and the light source is a central source, while in LED (light emitting diode) displays, each pixel is an individual light emitter.

LCD screens may comprise Twisted Nematic (TN) displays containing Liquid Crystal (LC) elements which twist and untwist at varying degrees to allow light to pass through. When no voltage is applied to such a TN liquid crystal cell, the light is polarized to pass through the cell. In proportion to the voltage applied, the LC cells twist up to 90 degrees changing the polarization and blocking the path of the light. By changing voltage level, colour and transmission can be changed.

Another type of LCD screen is the TFT-LCD screen (Thin Film Transistor). High resolution color displays such as modern LCD computer monitors and televisions use an active matrix structure. A matrix TFT is added to the polarizing and color filters. Each pixel has its own dedicated transistor, allowing each column line to access one pixel. When a row line is activated, all of the column lines are connected to a row of pixels and the correct voltage is supplied to all of the column lines. The row line is then deactivated and the next row line is activated.

A TFT is a special kind of field effect transistor made by depositing thin films for metallic contacts, semiconductor active layer, and dielectric layer. The channel region of a TFT is a thin film that is deposited onto a substrate, often glass since the primary application of TFTs is in liquid crystal displays. Most TFTs are not transparent themselves, but their electrodes and interconnects can be. Today most LCD screens are based on TFTs.

An organic light-emitting diode, OLED, is a special type of LED in which the emissive layer comprises a thin-film of certain organic compounds. The emissive electro-luminescent layer can include a polymeric substance that allows the deposition of suitable organic compounds, for example, in rows and columns on a flat carrier by using a simple "printing" method to create a matrix of pixels which can emit light of different colours. Such systems can be used in television screens, computer displays, portable system screens, and in advertising and information and indication applications etc.

Figure 8:
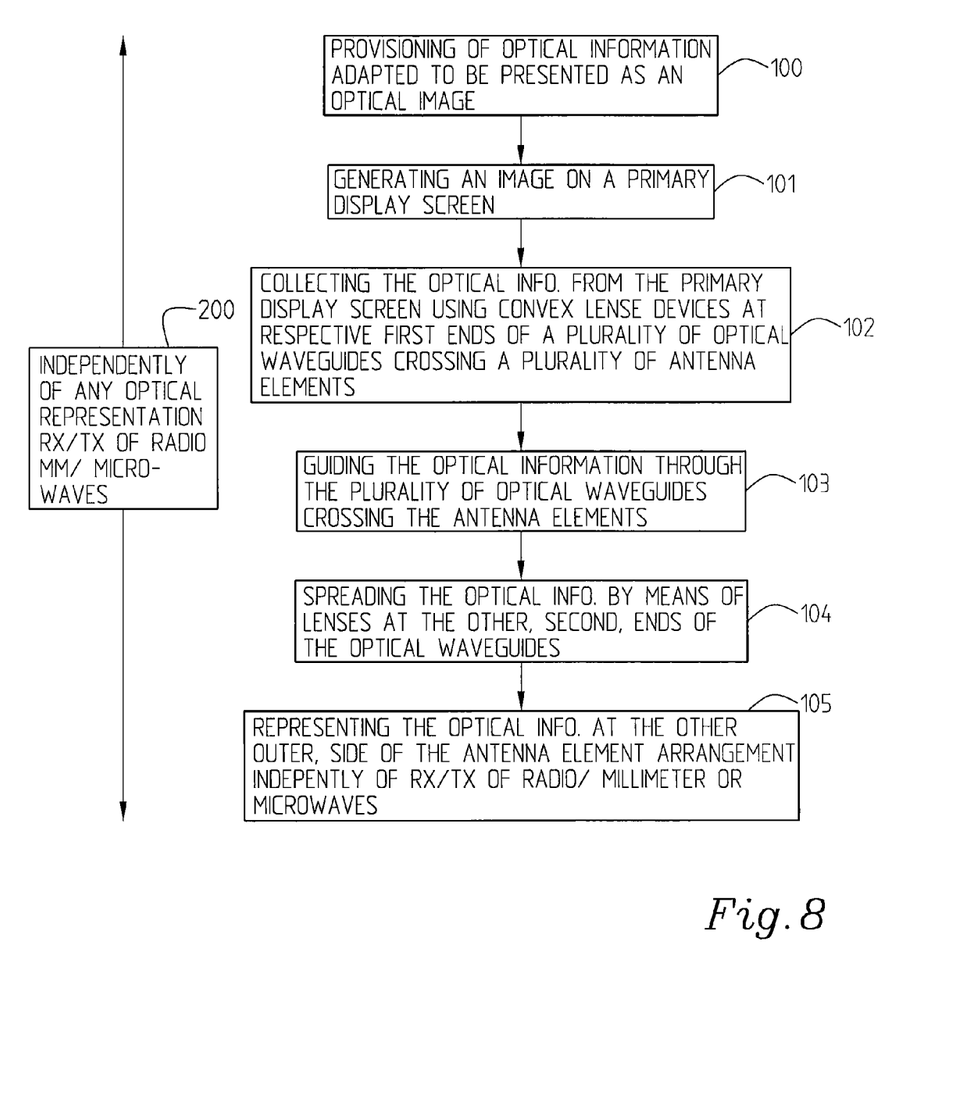
FIG. 8 is a schematical flow diagram describing one implementation of image representation with a display and antenna arrangement according to the present invention.

FIG. 8 is a flow diagram schematically describing the inventive procedure. Optical information is provided, e.g. as graphical information generated in image generating means, for example a graphics generator comprising computer graphic cards and drivers etc. The graphical or optical information is signaled to image generating pixel elements of a primary display (video signal to optic converter), 100. An image is generated on the primary display screen by means of the image generating pixel elements, 101. The signals are then coupled out from the respective pixel elements of the primary display into optical fibers or waveguides comprising convex lens devices for collecting/collimating the light information at respective first ends of the plurality of optical waveguides, 102. It should be noted that the lense devices do not have to be convex. They may alternatively e.g. be flat. Optionally they are (flat, concave or convex) directly attached to the respective pixel element. The optical waveguides cross antenna elements, or an entire (entirely or partly conductive) layer, arranged on the primary display screen. The optical information is guided through the plurality of optical waveguides crossing the antenna elements or the entire layer containing them, 103. At the other ends of the respective optical fibers or waveguides the signals are via lens devices coupled out of the waveguides and spread by means of said lenses, 104. Finally the optical information is represented at the other, outer, side of the antenna element also acting as a functional display and, independently thereof receiving/transmitting e.g. radio waves.

It should be clear that the invention can be varied in a number ways, without departing from the scope of the appended claims. It can also be used for other terminal devices and implemented on optical information display surfaces in general, for example windows etc. Also in other aspects the inventive concept is not limited to the specifically illustrated embodiments.

The invention claimed is:

1. A display and antenna arrangement comprising a primary display screen and an antenna arrangement comprising a number of receiving and/or transmitting elements formed by an at least in given areas electrically conductive layer and adapted to receive/transmit radio-, millimeter waves or micro- or sub-microwaves, wherein the electrically conductive layer at least in the given areas is perforated and comprises a plurality of densely arranged holes crossing said electrically conductive layer, the conductive layer being provided on the front of the primary display screen, and said holes or perforations being adapted to guide light/optical information from the primary display screen through the electrically conductive layer at least in given areas comprising holes or perforations, wherein the outer surface of the electrically conductive layer faces away from the primary display screen, said outer surface acting as a secondary, functional display screen providing the optical image to a user, wherein said holes at least partly are filled or contain a dielectric material, that the holes or perforations are provided with lenses with given properties or shapes, or have an expanded or continuously or in discrete steps expanding cross section wherein the dielectric material arranged in said expanded or expanding inner portion is adapted to act as a lens, for collection of light from the primary display screen at respective inner end portions facing the primary display screen, and/or that the holes or perforations, acting as optical waveguides, at their outer end portions facing away from the primary display screen are provided with lens devices or are expanded or have an increasing cross-section whereby the dielectric material arranged in such an expanded or expanding outer end portion is adapted to act as a convex/concave lens with given properties or shapes, to control the spreading of the light, i.e. the optical information.

2. The display and antenna arrangement according to claim 1, wherein the dielectric material has a refractive index substantially between 1.3-2 to provide optimal optical guiding properties.

3. The display and antenna arrangement according to claim 1, wherein characterized in that the holes or perforations are cylindrical or have circular cross-sections.

4. The display and antenna arrangement according to claim 1, wherein the holes or perforations have a cross-section, in a plane parallel with the plane of the display screen or the electrically conductive layer, which is circular, elliptical, square-shaped, oval or rectangular.

5. The display and antenna arrangement according to claim 1, wherein each hole or perforation has a cross-section which is larger at an inner end portion of the hole facing the primary display screen than at a central portion of the hole.

6. The display and antenna arrangement according to claim 1, wherein each hole or perforation has a cross-section which is larger at an outer end portion of the hole/perforation distant from the primary display screen than at a central portion of the hole.

7. The display and antenna arrangement according to claim 1, wherein the lenses of the inner end portions comprise collimating lenses.

8. The display and antenna arrangement according to claim 1, wherein the electrically conductive layer forming the antenna arrangement is disposed on the primary display screen, covering the major part of or substantially the whole display screen surface and in that the holes or perforations are provided substantially throughout the electrically conductive layer or cover the entire area of the primary screen.

9. The display and antenna arrangement according to claim 1, wherein resolution is obtained at the second functional display screen functionality which at least corresponds to the resolution obtained at the primary display screen.

10. The display and antenna arrangement according to claim 1, wherein filled holes or perforations are adapted to act as optical waveguides guiding light from light elements or optical sources comprising pixel elements in the primary display means.

11. The display and antenna arrangement according to claim 10, wherein screening means are provided between all respective adjacent pixel elements so that light from each respective pixel element will be collected by and guided through one respective perforation or optical waveguide respectively.

12. The display and antenna arrangement according to claim 1, wherein it is adapted to form a display screen and antenna arrangement of a wireless communication device.

13. The display and antenna arrangement according to claim 12, wherein the wireless communication device comprises a laptop, a palmtop, a mobile telephone or any other multimedia communication device.

14. The display and antenna arrangement according to claim 1, wherein said given areas comprise antenna elements comprising antenna patches of any shape, such as square shaped, circular, rectangular.

15. The display and antenna arrangement according to claim 1, wherein the receiving and/or transmitting elements are antenna elements arranged to form an array or a number of sub-arrays.

16. The display and antenna arrangement according to claim 14, wherein feeding and/or control means are provided which are adapted to separately or groupwise feed and/or control the antenna elements.

17. The display and antenna arrangement according to claim 16, wherein the feeding and/or control means comprise switches and/or combining means, e.g. a distribution network, for radio-/millimeter wave or microwave signal processing, associated with, comprised by or separate from said feeding and/or controlling means.

18. A method for handling reception/transmission of radio-/millimeter waves or micro- or sub-microwave signals and presentation of optical information, comprising the steps of:
receiving/transmitting said signals in/from receiving/transmitting elements provided in an electrically conductive layer disposed on a primary display screen,
presenting, independently, of the said signals, an optical image generated on the primary display screen on the front of the electrically conductive layer, on the surface opposite to the surface of the conductive layer disposed on the primary display screen by means of:
conducting light through a plurality of holes or perforations densely located through at least a major part of the electrically conductive layer, such that the optical image will be transferred through said electrically conductive layer,
presenting the transferred optical image on a functional second display screen provided at the front, outer surface of the electrically conductive layer whereby there is no interference or screening neither of optical image nor of the received/transmitted radio-/millimeter waves or micro- or sub-microwaves signals, wherein the holes or perforations at least partly are filled with a dielectric material, and that the method comprises the steps of:
collimating the light at the inner end portions of the holes or perforations facing the primary display screen,
spreading, by means of convex, concave lenses or similar, the light at the output, at the other end portions of the holes on the functional second display screen.

19. The method according to claim 18, wherein the primary display screen comprises a display screen of a wireless communication device, a laptop, a palmtop, a mobile telephone while, substantially the entire display screen being used also for arrangement of an antenna arrangement.

* * * * *

UNITED STATES PATENT AND TRADEMARK OFFICE
CERTIFICATE OF CORRECTION

PATENT NO.        : 8,213,757 B2
APPLICATION NO.   : 12/746735
DATED             : July 3, 2012
INVENTOR(S)       : Harrysson et al.

Page 1 of 1

It is certified that error appears in the above-identified patent and that said Letters Patent is hereby corrected as shown below:

In Column 10, Line 40, in Claim 3, delete "characterized in that".

In Column 10, Line 67, in Claim 9, delete "wherein resolution" and insert -- wherein a resolution --, therefor.

In Column 11, Line 4, in Claim 10, delete "wherein" and insert -- wherein the --, therefor.

Signed and Sealed this
Sixth Day of November, 2012

David J. Kappos
*Director of the United States Patent and Trademark Office*